(12) United States Patent
Oliver

(10) Patent No.: US 7,483,018 B2
(45) Date of Patent: Jan. 27, 2009

(54) SYSTEMS AND METHODS FOR PROVIDING A COMBINED PEN AND MOUSE INPUT DEVICE IN A COMPUTING SYSTEM

(75) Inventor: Thomas C. Oliver, Windsor, CO (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 11/121,806

(22) Filed: May 4, 2005

(65) Prior Publication Data

US 2006/0250380 A1    Nov. 9, 2006

(51) Int. Cl.
G06F 3/033    (2006.01)
(52) U.S. Cl. .................. 345/179; 178/19.01; 345/166
(58) Field of Classification Search ............. 345/157, 345/162, 179, 156, 163, 166; 178/18.09, 178/19.01–19.05; 382/313–314
See application file for complete search history.

(56) References Cited

U.S. PATENT DOCUMENTS

| | | | | |
|---|---|---|---|---|
| 5,294,792 A * | 3/1994 | Lewis et al. | ............. | 345/163 |
| 5,408,250 A | 4/1995 | Bier | ............. | 345/169 |
| 5,434,594 A * | 7/1995 | Martinelli et al. | ............. | 345/163 |
| 5,652,412 A * | 7/1997 | Lazzouni et al. | ............. | 345/179 |
| 5,729,251 A | 3/1998 | Nakashima | ............. | 345/179 |
| 6,130,666 A * | 10/2000 | Persidsky | ............. | 345/179 |
| 6,486,875 B1 * | 11/2002 | O'Donnell, Jr. | ............. | 345/179 |
| 6,686,579 B2 * | 2/2004 | Fagin et al. | ............. | 345/180 |
| 6,806,868 B2 * | 10/2004 | Chuang | ............. | 345/179 |
| 6,831,632 B2 | 12/2004 | Vardi | ............. | 345/179 |
| 6,956,564 B1 * | 10/2005 | Williams | ............. | 345/179 |
| 7,030,864 B2 * | 4/2006 | Yueh | ............. | 345/179 |
| 7,098,894 B2 * | 8/2006 | Yang et al. | ............. | 178/19.05 |
| 7,109,979 B2 | 9/2006 | Moyne et al. | ............. | 345/179 |
| 7,116,427 B2 * | 10/2006 | Baney et al. | ............. | 345/166 |
| 2001/0034861 A1 | 10/2001 | Kang | | |
| 2001/0035861 A1 * | 11/2001 | Ericson et al. | ............. | 345/179 |
| 2004/0135776 A1 * | 7/2004 | Brouhon | ............. | 345/179 |
| 2006/0028442 A1 * | 2/2006 | Bynum et al. | ............. | 345/157 |

OTHER PUBLICATIONS

U.S. Appl. No. 10/891,484, filed Jul. 15, 2004, Larsen et al.
St-Michel, Stephanie and Brian Aust, "Autoplay in Windows XP: Automatically Detect and React to New Devices on a System," MSDN Magazine, 2001, 16(11), 1-14.

* cited by examiner

Primary Examiner—Chanh Nguyen
Assistant Examiner—Allison Walthall
(74) Attorney, Agent, or Firm—Woodcock Washburn LLP

(57) ABSTRACT

Currently, a user may need to carry or otherwise keep track of both a mouse and electronic pen for a computer, such as a portable computing device. Carrying or otherwise keeping track of both devices can be tedious. Accordingly, systems and methods for providing a dual mode mouse pen are enabled, whereby the mouse pen may be used as both a pen, or alternatively, as a mouse. In one embodiment, the pen may include a switch to select one of two modes: pen or mouse.

16 Claims, 14 Drawing Sheets

SYSTEMS AND METHODS FOR PROVIDING A COMBINED PEN AND MOUSE INPUT DEVICE IN A COMPUTING SYSTEM

FIELD OF THE INVENTION

The present invention provides systems and methods for combining a first input device, such as an electronic pen or a stylus, and a second input device, such as a mouse, in a computing system to reduce the number of input devices to be held by a user. More particularly, the invention provides a dual mode pen and mouse input device, which may be used as an electronic pen, or a stylus, in a first mode, and which may be used as a mouse pointer device in a second mode.

BACKGROUND OF THE INVENTION

User interaction with computers continues to increase each day. More jobs require individuals to interact with computers and more people are choosing to interact with computers for both work and entertainment. Various tracking devices for interacting with a computer include electronic mice, keyboards, joysticks, and touch pads. Along with the proliferation of various computing devices for work and entertainment has come the concomitant proliferation of various tracking devices. Other tracking devices, including electronic pens or styluses, personal digital assistants (PDAs), cellular telephones, remote controls and other computing devices, thus have evolved to allow users to interact with different computers and computer systems, sometimes in a specialized manner. For instance, electronic pens or styluses give a user the precision with an input device, to capture and translate pen strokes as input to a host device, in a manner that preserves the integrity of the movement of the pen or stylus to sufficient degree of detail such that the user may draw illustrations, draft letters or notes with handwriting, or perform operations in connection with any other host applications that make special use of the enhanced input characteristics of the electronic pen or stylus.

Tracking devices generally fall into one of two types of systems: relative tracking systems or absolute tracking systems. A relative tracking system has the ability to discern relative motion from one position to another, independent of knowledge of absolute position. Methods of relative optical tracking include image correlation, differential pattern gradient based, laser speckle based and Doppler-based among others. One feature of a relative tracking system is that one or more sensors detect signals that change over time and can be processed in various ways to determine changes in relative position. An absolute tracking system has the ability to discern a position of the device irrespective of a previous determination. Electronic pens, for instance, commonly implement absolute tracking systems, and input devices generally implement one or the other, but not both relative and absolute tracking systems. Cost, size, and difficulty in combing the two from a technological standpoint have left manufactures choosing from one of the two methods when constructing their respective devices, though some pens may include both types of systems. For instance, commonly assigned copending U.S. patent application Ser. No. 10/891,484, entitled "Methods and Apparatuses for Compound Tracking Systems," filed Jul. 15, 2004 describes such a system.

As the use of pens becomes more ubiquitous with PCs, laptops, handheld devices such as PDAs, and other mobile devices, the number of computing device scenarios that require a user to bring a pen along with the computing device has also increased. Currently, for instance, a traveler may need to carry both a pen and a mouse on a business trip. Precious space is required to carry each device so the user may decide not to carry one or both. Consequently, in order to make a pen more appealing to a customer, it would be desirable to increase the functionality of the pen beyond its computing device input tracking functionality. It would be further desirable if the pen could be used as both a pen and as a traditional mouse pointer device. It would be still further desirable to allow a user to simply switch between two modes corresponding to the mouse functionality of the pen device and the ordinary operation of the pen device, such as allowing a user to switch simply between ordinary pen mode-and mouse mode. If such a device was available, the customer would only need to carry a single device.

SUMMARY OF THE INVENTION

In view of the foregoing deficiencies identified in the state of the art with respect to input devices, the present invention provides systems and methods for a dual mode input device, such as a pen or a stylus, in a computing system that operates as both a mouse input device and a pen input device. In a first mode, the pen operates as a mouse input device, and in a second mode, the pen operates as a traditional pen or stylus input device. In various embodiments, the invention relates to the provision of electronics inside the input device, such as an electronic pen and a corresponding mode of operation of the input device to perform behavior traditionally associated with a mouse device, while also having an input mode that relates to the ordinary operation of the pen or stylus, for greater accuracy in drawing and other tasks suited to pen operation.

Other features of the present invention are described below.

BRIEF DESCRIPTION OF THE DRAWINGS

The system and methods for providing a dual mode input device are further described with reference to the accompanying drawings in which.

DETAILED DESCRIPTION OF ILLUSTRATIVE EMBODIMENTS

Overview

As mentioned in the background, currently, a traveler may need to carry both a pen and a mouse on a business trip whereby precious space is required to carry each device, so the user may end up forgetting one or both, or deciding not to carry one or both, creating inconvenience. Accordingly, to address this and other scenarios, the invention provides a pen that can be used as both a pen and as a mouse. In one embodiment, the pen or stylus of the invention contains a switch to select between one of two modes: pen mode or mouse mode. For the avoidance of doubt, a stylus as the term is utilized herein refers to both active and passive kinds of styluses, i.e., with or without internal electronics apart from the capabilities of the mouse mode of the present invention. Moreover, the term is meant to signify both tethered (e.g., by a string or cord) and un-tethered styluses alike. In various embodiments, the pen of the pen mode of the mouse pen of the invention may employ non-grazing illumination and/or speckle navigation techniques and the mouse of the mouse mode of the mouse pen of the invention may employ grazing or non-grazing illumination and/or speckle navigation techniques. Thus, the customer using the dual mode mouse pen of the invention can carry fewer devices while enjoying the same functionality that multiple devices provide.

Interfaces are provided in the pen that enable a user to easily exchange navigational or positional data with another computing device, e.g., via any wired or physically connected means, such as a USB port, and/or any wireless means, such as communications according to the 802.11x or Bluetooth protocols, or any other exchange mechanism commonly used for exchanging navigational or positional data between two computing devices as would be appreciated by one of ordinary skill in the art.

Systems and Methods for Providing a Dual Mode Mouse Pen

Figure 1:
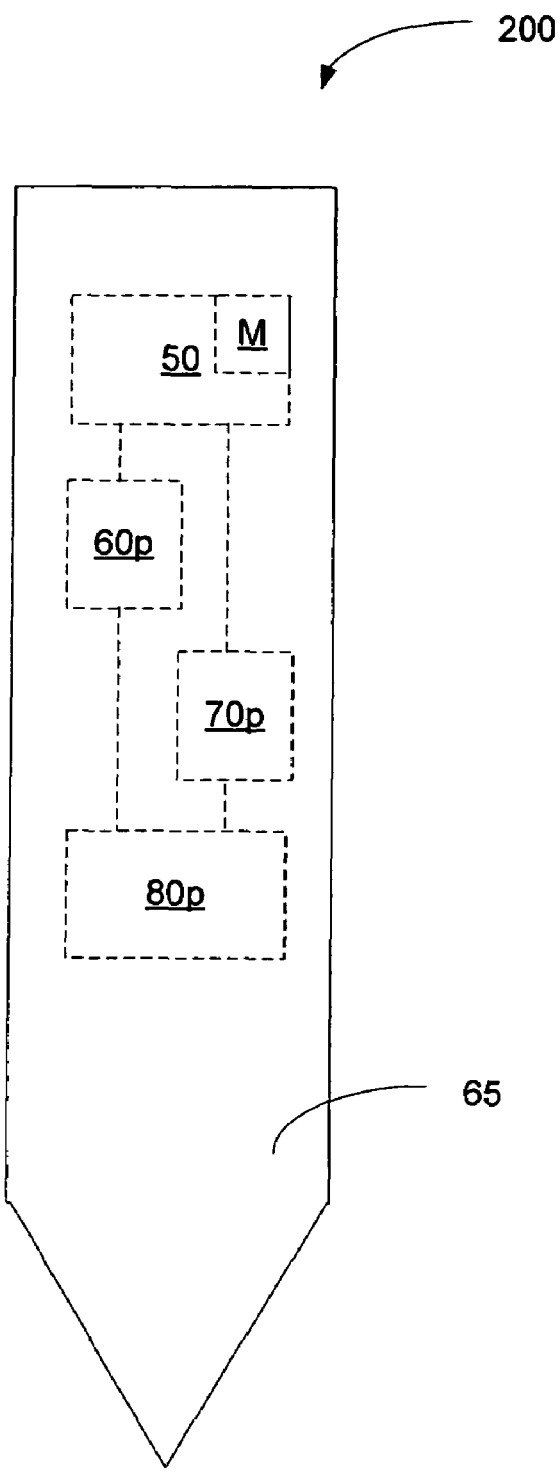
FIG. 1 is a block diagram of an exemplary non-limiting input device representative of the type of input device in which the present invention may be implemented.

FIG. 1 is a side view of an exemplary computer input device 200 with a schematic representation of internal components in which the invention may be implemented. Computer input device 200 includes a longitudinally extending housing 65, e.g., a cylindrical shape or sometimes having a hexagonal or rectangular (or other shaped) cross-section, which typically comes to some point, or other narrower portion compared to the rest of longitudinally extending housing 65, which generally operates as a point of input for the input device 200. Computer input device 200 may be an electronic pen-type device. Computer input device 200 may include actuatable buttons and/or sensors, such as zero travel binary contact sensors or Force Sensitive Resistors (FSRs), allowing a user to activate a UI element, such as an icon, and/or perform an action with the computer input device 200. Computer input device 200 also is shown to include a control system 50, a relative tracking subsystem 60p and/or an absolute tracking subsystem 70p, and sensor(s) 80p. Reference elements 50, 60p, 70p and 80p are shown in broken line form to represent that these components may be internal to the computer input device 200. In all applicable embodiments of the invention, computer input device 200 may optionally include a power source, such as a battery (not shown).

Control system 50 may be a custom silicon chip, a digital component, and/or a microprocessor component for computation of data, processing of signals, and interface with a host computer (not shown). Control system 50 is shown to be connected to each subsystem, relative tracking subsystem 60p and/or absolute tracking subsystem 70p. Each tracking subsystem 60p and/or 70p is shown connected to sensor(s) 80p. As shown in FIG. 1, each subsystem uses the sensor(s) 80 for capturing data for tracking the movement of the computer input device 200. Although not shown in FIG. 1, each tracking subsystem 60p and 70p may have an independent sensor 80p for tracking purposes. Further, it should be understood that sensor(s) 80p may be included within each subsystem 60p and 70p. It should also be understood that if a common sensor 80p is used for both subsystems 60p and 70p, the frame rates for each subsystems may be different and the quantity of data provided to each subsystem may be different. For example, a larger set of data may be captured and needed for the absolute position decoding, while a subset of that data can be used for the relative tracking, allowing quicker processing.

Figure 2:
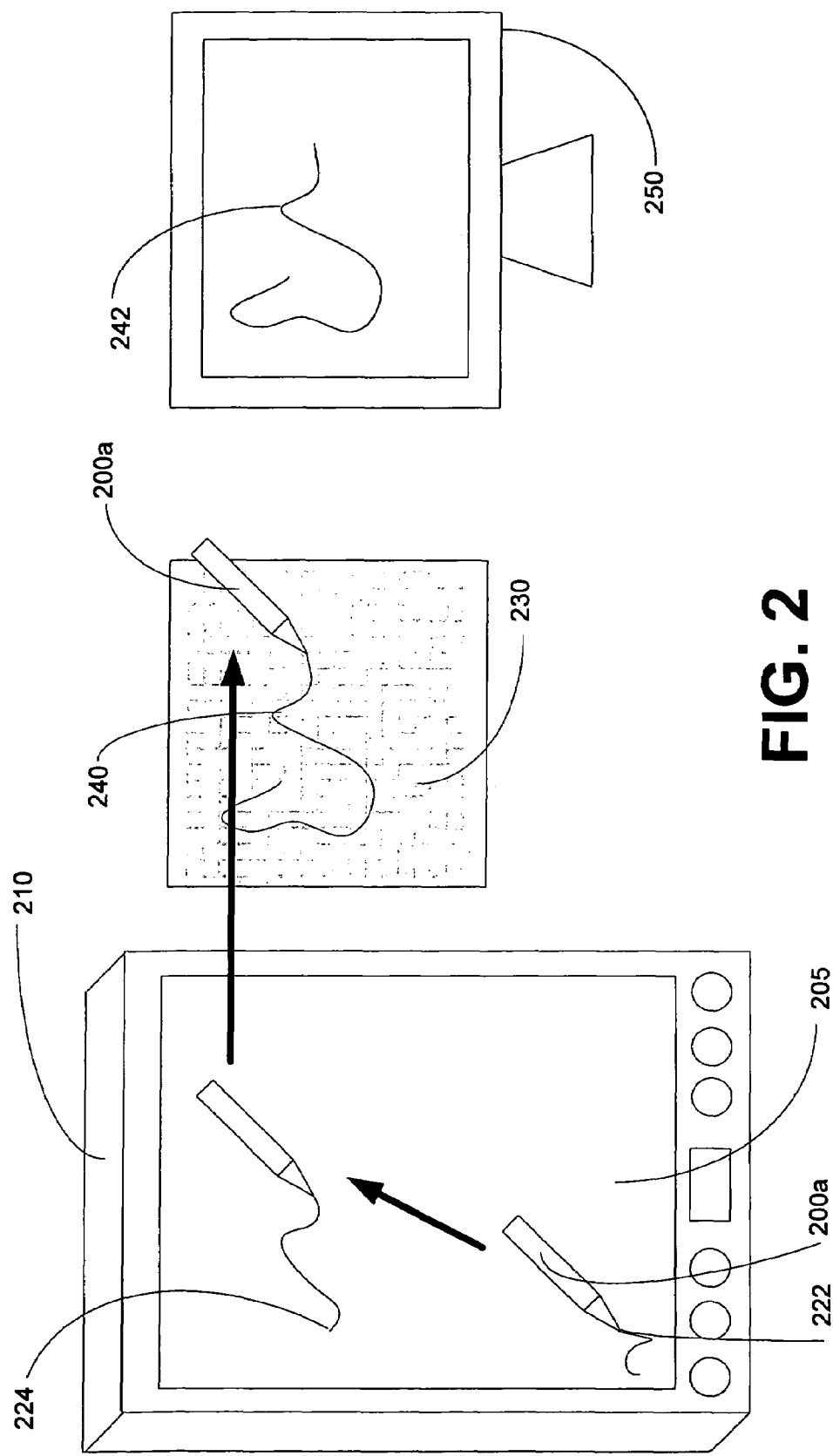
FIG. 2 is a block diagram representing an exemplary non-limiting electronic pen and associated functionality generally illustrating the ordinary operation of the electronic pen as an input device.

Sensor(s) 80p capture data corresponding to movement of the computer input device 200. The data is sent through the relative tracking subsystem 60p and/or the absolute tracking subsystem 70p where the data is processed to determine position data representative of the approximate position of the computer input device 200. The position data is then transferred via any wired means to the control system 50 where the data is subsequently sent to a host computer (not shown) for use in an application program. For example, the movement of the computer input device 200 may correspond to the movement of a cursor position on a display of the host computer as shown in FIG. 2 and described below. Although not shown in FIG. 1, control system 50 may include a memory M, such as register storage or flash storage, which is typically used for storing the position data for transmission to the host computer at a later time. In recognition that the specialization of current pens and styluses as such prevents use for other purposes, the invention provides a second mode for an input device 200 that makes it possible to perform traditional mouse functions for input to a host computer.

Computer input device 200 thus represents an illustrative example of a tracking device that is configured to track the movement of the computer input device 200 by a relative tracking method and/or an absolute tracking method. The capability to track based upon a relative tracking method or an absolute tracking method may be contained within the same physical housing 65 of computer input device 200. It should be understood by those skilled in the art that control system 50, relative tracking subsystem 60p and absolute tracking subsystem 70p may be implemented by hardware components, software components, firmware components, and/or any combination of hardware, software, and firmware components.

FIG. 2 is a schematic diagram of an illustrative embodiment of a computer device tracking system for use with a computer application in accordance with at least one aspect of the present invention. FIG. 2 illustrates how a computer input device, such as an electronic pen 200a, can be used to track movement of the electronic pen 200a based upon a relative tracking method and/or an absolute tracking method during ordinary operation. Thus, FIG. 2 illustrates some exemplary scenarios showing use of the computer input device 200 of FIG. 1 as an electronic pen 200a. For instance, a user can use electronic pen 200a on a screen 205 of a notebook type computer 210, or PDA, or other portable computing device. Screen 205 is a predefined area in which the position of the electronic pen 200a can be tracked. As an example of an exemplary use of pen 200a, as a user moves the electronic pen 200 across the surface of the screen 205, the position of the electronic pen 200a may be tracked based on a relative tracking system. In such a case, points of contact 222 and 224 may be determined relative to other positions, to a trajectory of contact points, and/or other relative features.

In accordance with at least one aspect of the present invention, the user can also use an electronic pen 200a on a piece of encoded paper 230, such as a sheet of paper that includes an embedded pattern, such as generally shown on encoded paper 230 in FIG. 2. As the user moves the electronic pen 200a across the surface of the paper 230, the movement 240 of the point of contact of the electronic pen 200a against the surface of the paper 230 can be tracked. The movement 240 can be tracked based upon an absolute tracking method utilizing the encoded surface information. For example, a user can draw an object on the paper 230 and the object is entered into an application program running on a host computer. For instance, a monitor 250 connected to the host computer can display the corresponding object 242. In such a case, the electronic pen 200a communicates with the host computer to send absolute position data for the application running on the host computer to use. It should be understood by those skilled in the art that the application program may be external to the host computer as well. Therefore, under at least one embodiment, the compound tracking device 200a may be used for absolute tracking purposes and/or relative tracking purposes without a host computer. Moreover, the electronic pen 200a may be tethered to a host computer for use with the host computer or un-tethered, or free-standing, e.g., so that the pen 200a may be used with a variety of machines and is not tied to use with any one machine. Thus, FIG. 2 illustrates a variety of uses of electronic pen 200a, including the common scenario of drawing on screen (or otherwise designating pixels) of a host computer directly by applying the pen 200a to the display, or indirectly via a separate surface that is translated to the appropriate regions of display.

Figure 3:
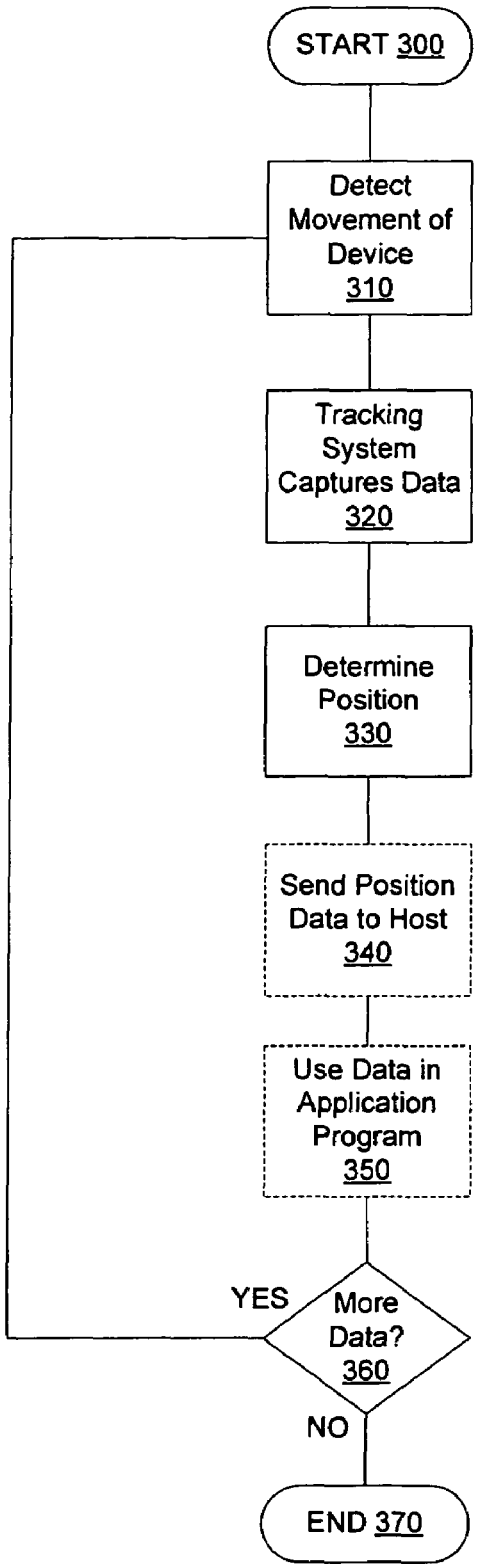
FIG. 3 is an exemplary non-limiting flow diagram representing a typical use scenario for the ordinary operation of an electronic pen as an input device in accordance with one mode of the present invention.

FIG. 3 is a flow chart of another illustrative method for tracking movement of a device in accordance with at least one aspect of the present invention. The process starts at 300 and at step 310, movement of the device is detected. Upon detection of movement, either a relative tracking system and/or an absolute tracking system captures data in step 320. The relative position data and/or absolute position data are then used, at step 330, to determine the position of the device. Such an implementation may be used to generate precise position information. At step 340, the position data is then optionally sent to the host computer. At step 350, optionally, the host computer may store the data, or use the data for an application program running on or external to the host computer. The process moves to step 360 where a determination is made as to whether more data needs to be captured. If more data needs to be captured, the process returns to step 310 If not, the process ends at 370. It should be understood by those skilled in the art that the position data may be stored in memory on the device before sending the position data to the host computer and that the example shown in FIG. 3 is but one non-limiting example.

In consideration of the limited input functionality of today's pen or stylus type input devices, i.e., the failure to provide functionality beyond the existing pen or stylus functionality, the invention provides in various embodiments a dual-mode mouse pen and associated interfaces for providing input to a host device and its application(s). Thus, when a traveler may wish to carry both a pen and a mouse on a business trip, e.g., for a Tablet PC, the mouse pen of the invention may thus provide both without the need for two devices. When pen functionality is desired, the mouse pen may be used as a pen, and when mouse functionality is desired, the mouse pen may be used as a mouse. The dual-mode mouse pen could thus be used as both a pen and as a mouse. In various embodiments, the pen includes a switch to select one of two modes: pen or mouse.

To provide a general description of what a "mouse" is, a mouse is a device that a computer user pushes across a surface, such as a mousepad or desk surface, in order to point to a place on a display screen of a computing device and/or to select one or more actions to take from that position. Today, the mouse is an integral part of the graphical user interface (GUI) of many computing devices.

A mouse generally comprises a metal or plastic housing or casing, a navigational component generally located underneath the housing and adjacent to the surface over which the mouse is moved, one or more buttons on the top of the casing, and a wired or wired connection that connects the mouse to the computer. As the navigational component is moved over the surface in any direction, a sensor sends impulses to the computer that causes a mouse-responsive program or process to reposition under control of the mouse movement a visible indicator, e.g., a cursor or pointer, or other icon on the display screen. As mentioned, with relative positioning, the positioning is relative to a variable starting place. Viewing the cursor's present position, the user readjusts the position by moving the mouse. And with absolute positioning, the positioning is known through pattern recognition or other image analysis that determines the absolute position of the mouse.

The most conventional kind of mouse has two buttons on top: a left button and a right button, with the left one generally being used more frequently, though a variety of scroll bars and other buttons and controls may be found on modern mouse devices for additional capabilities. For exemplary description of the use of the typical left and right mouse buttons found on most mousse in some operating systems, for instance, a left mouse button lets the user "click" once to send a "Select" indication that provides the user with feedback that a particular position has been selected for further action. The next click on a selected position or two quick clicks on the selected position, or "double click," causes a particular action to take place on the selected object. For example, in some operating systems, a double click causes a program associated with that object to be started. The second button, on the right, usually provides some less-frequently needed capability. For example, when viewing a Web page, you can click on an image to get a popup menu that, among other things, lets you save the image on your hard disk. Some mouse manufacturers also provide a version for left-handed people.

Some operating systems let the user adjust the sensitivity of the mouse, including how fast the indicator moves across the screen in response to mouse movement, the amount of time that must elapse within a "double click," etc. In some systems, the user can also choose among several different cursor appearances. In some applications, such as games, the mouse input can be used to control a more complex indicator, such as a character in a game and issue commands in connection with that character (e.g., left movement+left click=left uppercut in boxing game). While some CAD and other drawing programs such as Visio allow a user to use a mouse similar to the drawing input functionality of an electronic pen, the main issue is one exactitude, or granularity. While a mouse may be adequate for creating a circle on screen according to pre-defined circle geometry by helping to specify a radius, or for creating a square by helping to specify the length of a side according to pre-defined square geometry, a mouse is not very good for drawing a circle or square "from scratch", i.e., without the assistance of pre-defined geometries. Simply put, since you cannot see the underside of the mouse while drawing an object or writing free-form, relative drawing movements requiring anything more than trivial directional control and eyesight and/or careful hand position control over the drawing to implement, such as cursive handwriting, freehand drawing and artistry, etc. are all by definition difficult.

Thus, as described in exemplary fashion above in FIGS. 1-3, electronic pens have been provided which facilitate such precise drawing. By way of further description, current pens or styluses include an imager integrated circuit (IC) portion, a processing IC portion and light emitting diode (LED) illumination for illuminating a surface and processing the reflection of the light emitted from the LED(s). The image IC portion receives the light reflected by the pen and forms image(s) from the light. In turn, the processing IC processes or interprets the image(s) to glean information about the movement of the pen, and to turn that information into a form more readily understandable by the host (position, vector and/or other directional information) and/or to transmit button clicks or selections via the mouse to the host.

Such processing by the processing IC can be according to absolute positioning techniques, wherein absolute position of markings, such as dots, is encoded on the surface, such that an image of subsection of the markings determines the absolute position of the pen. Such processing by the processing IC can also be according to relative positioning techniques, wherein relative positioning of markings, such as dots, is encoded on the surface, such that it may be determined from a plurality of images of the surface where the pen is moving by comparison.

Having described mouse and pen operation generally, as mentioned, the invention provides an electronic pen that also includes mouse functionality as well as methods for selecting between two modes of operation in the mouse pen of the invention including an ordinary pen operation mode and a mouse mode.

Figure 4A:
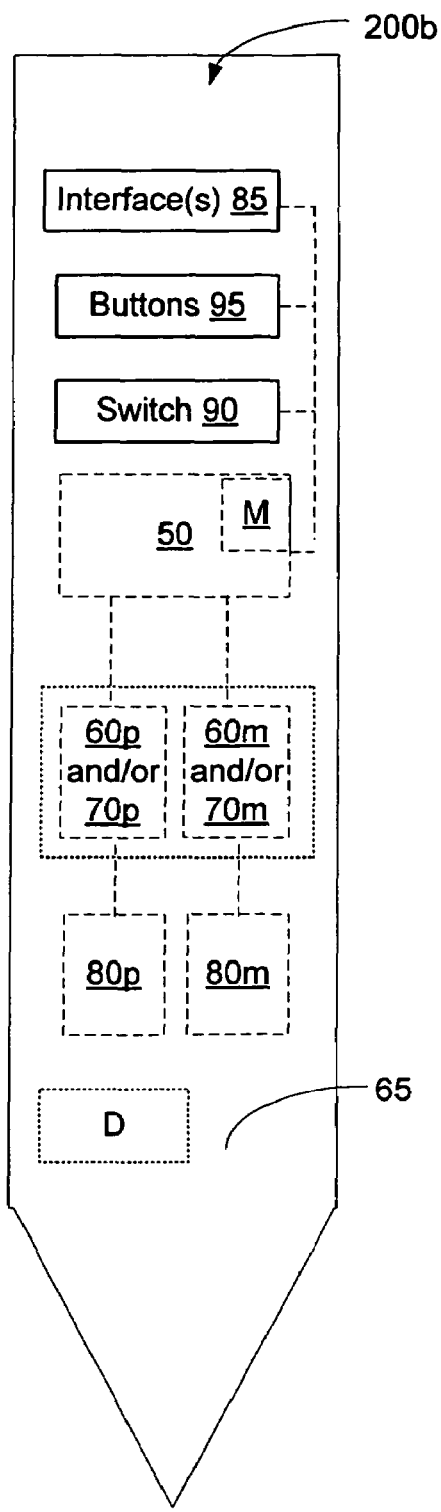
FIGS. 4A and 4B illustrate exemplary non-limiting embodiments of a dual use mouse pen in accordance with the invention.

As illustrated in FIG. 4A, a first embodiment of the invention is shown. In FIG. 4A, similar to FIG. 1, electronic pen 200b includes a housing 65 and control unit 50, tracking subsystem(s) 60p and/or 70p and sensor(s) 80p. These components comprise the set of electronics for outputting positional information about the pen 200b during ordinary or customary use of the pen 200b as an electronic pen input device. In FIG. 4A, memory M, such as a flash memory, ordinarily operates to store positional information from the sensor(s) 80p and/or tracking subsystem(s) 60p and/or 70p. In accordance with the invention, part of memory M, or separate memory, may be utilized to store positional data or other command data originating when the mouse pen is in mouse mode. In this regard, a second mode and second "mouse" control, which as shown is integrated with control 50, but could also be provided separately, is provided to interact with memory M (a "separate" memory may also be provided for this purpose). The second mode is for performing mouse operations with the pen 200b to perform some function with respect to the host computer, such as select or play a music file, view an image or document, select a file or other on screen icon, or engage the operating system or any application that cooperates with or is integrated with control 50.

In this regard, mouse electronics are also included in the pen 200b including control unit 50, mouse buttons or controls 95, relative tracking subsystem 60m and/or absolute tracking subsystem 70m and sensor(s) 80m. Sensor(s) 80m receive input according to known mouse techniques, and tracking subsystem(s) 60m and/or 70m process that information into digital form, and convey the information to control 50 for transmission to the host as input. Similarly, buttons 85 operate as input to the host device via control 50. While shown as separate, where appropriate, such electronics can be alternatively provided as part of the same integrated electronics, e.g., the tracking subsystem electronics may optionally be integrated.

In one embodiment of the invention, a switch 90 is provided for switching between pen mode under control of control unit 50 for generating and transmitting positional information about the pen 200b during ordinary pen operation, and for receiving navigational input from the mouse electronics, such as tracking subsystem(s) 60m and/or 70m in mouse mode from buttons 85 under control of control unit 50 for operating on user interface elements of a host computer in some fashion. Switch 90 may be any control known to those of ordinary skill in the art for inputting user selections to choose a mode. For instance, a display D may optionally be provided and include a UI that enables the user to select a mode, or buttons or a switch or other mechanical mechanism, may be actuated to switch the mode of pen 200b, and if display D is present, an indication of the mode can be displayed. Additionally, although not shown in the FIG. 4A, via a UI of a host computing device or button of a peripheral of the host computing device (e.g., button of a keyboard, mouse, etc.), a user may select a command that switches the pen 200b between pen mode and mouse mode. Such command is then transmitted to the pen 200b, and pen 200b switches modes upon receiving the command.

Pen 200b also includes interface(s) 85, which may be provided as software, e.g., application programming interfaces (APIs), hardware (e.g., USB or Bluetooth transceiver) or a combination thereof, for transmitting and receiving data, such as data files stored in or to be stored in memory M, to and from the pen 200b and a host device (not shown in FIG. 4A). Such interfaces can be integrated with control 50 or provided separately. As mentioned, display D may also optionally provided to assist the user with understanding the mode of operation of the pen 200b.

In one embodiment, in mouse mode of the invention, the X-Y coordinates are sent to a host computer over a wired (USB) or wireless link (Bluetooth or 27 MHz) via the Processing IC, such as control 50 of pen 200b of FIG. 4A. In another embodiment, any electronic pen that includes a "ball point pen" point would need to be covered so that ink is not dispensed on the surface when "mousing." For instance, a cap could be used to cover the ink dispenser and enable the mouse mode at the same time. In this fashion, the present invention is thus directed to a dual mode stroke capture pen that also serves as a wired or wireless mouse.

Figure 4B:
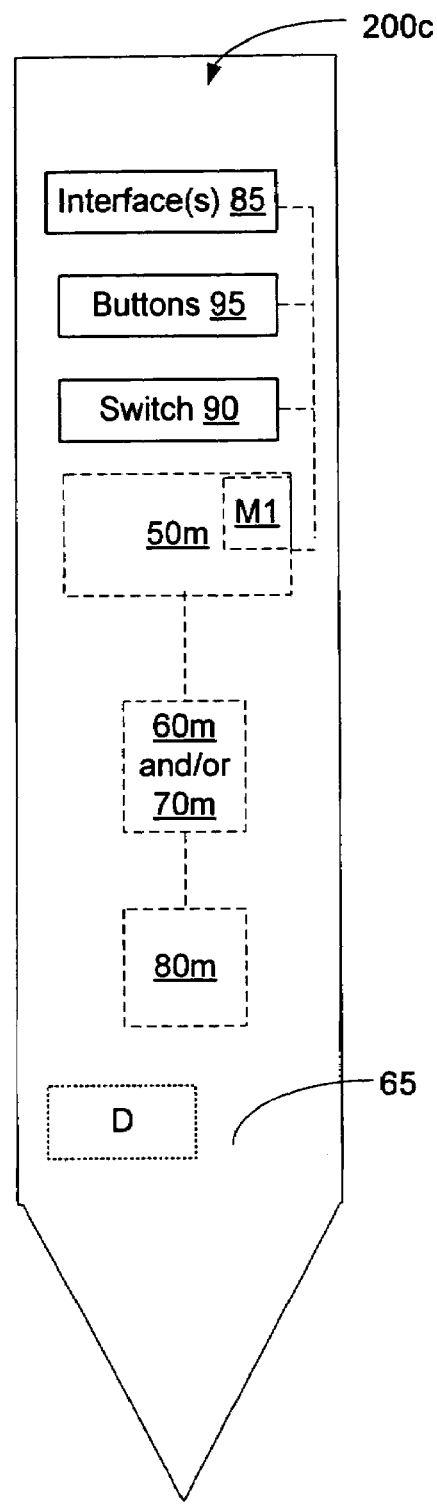

As illustrated in FIG. 4B, another embodiment of the invention with a passive (pen) stylus and an active mouse is shown. In this embodiment, as with any passive stylus, the passive stylus is used with a touch screen, such as may be found with PDAs, TabletPCs, kiosk displays, ATMs, etc. In the touch screen case, there are no electronics required within the stylus, since the screen electronics detect the tip of the pen. In the embodiment of FIG. 4B, mouse electronics have been nonetheless added to the passive stylus to supplement the passive pen with navigation capabilities.

As illustrated, electronic pen 200c of FIG. 4B includes a housing 65, the end of which is used in connection with the passive pen or stylus as usual. For mousing capabilities, a control unit 50m is included. A memory M1, such as a flash memory, may be utilized to store positional data or other command data originating when the mouse pen is in mouse mode. In this regard, a mouse mode and mouse control 50m is provided to interact with memory M1. In mouse mode, the pen performs mouse operations with the pen 200c to perform some function with respect to the host computer, such as select or play a music file, view an image or document, select a file or other on screen icon, or engage the operating system or any application that cooperates with or is integrated with mouse control 50*m*.

In this regard, the mouse electronics included in the pen 200*c* include control unit 50*m*, mouse buttons or controls 95, relative tracking subsystem 60*m* and/or absolute tracking subsystem 70*m* and sensor(s) 80*m*. Sensor(s) 80*m* receive input according to known mouse techniques, and tracking subsystem(s) 60*m* and/or 70*m* process that information into digital form, and convey the information to control 50*m* for transmission to the host as input. Similarly, buttons 85 operate as input to the host device via control 50*m*. While shown as separate, where appropriate, such electronics can be alternatively provided as part of the same integrated electronics, e.g., the tracking subsystem electronics may optionally be integrated.

In one embodiment of the invention, a switch 90 is provided for switching the mouse mode on and off. When mouse mode is engaged, control unit 50*m* of pen 200*c* operates to receive navigational input from the mouse electronics, such as tracking subsystem(s) 60*m* and/or 70*m* or other input from buttons 85 for operating on user interface elements of a host computer in some fashion. Switch 90 may be any control known to those of ordinary skill in the art for engaging and disengaging a function. Also, a display D may optionally be provided and include a UI that enables the user to select a mode, or buttons or a switch or other mechanical mechanism, may be actuated to switch the mode of pen 200*c*, and if display D is present, an indication of the mode can be displayed. Additionally, although not shown in the FIG. 4B, via a UI of a host computing device or button of a peripheral of the host computing device (e.g., button of a keyboard, mouse, etc.), a user may select a command that switches the pen 200*c* in and out of mouse mode. Such command is then transmitted to the pen 200*c*, and pen 200*c* switches modes upon receiving the command.

Pen 200*c* also includes interface(s) 85, which may be provided as software, e.g., application programming interfaces (APIs), hardware (e.g., USB or Bluetooth transceiver) or a combination thereof, for transmitting and receiving data, such as data files stored in or to be stored in memory M1, to and from the pen 200*c* and a host device (not shown in FIG. 4A). Such interfaces can be integrated with control 50*m* or provided separately. As mentioned, display D may also optionally provided to assist the user with understanding the mode of operation of the pen 200*c*.

In one embodiment, in mouse mode of the invention, the X-Y coordinates are sent to a host computer over a wired (USB) or wireless link (Bluetooth or 27 MHz) via the Processing IC, such as control 50*m* of pen 200*c* of FIG. 4B. Thus, in the embodiment of FIG. 4B, there is a passive mode when using the touch screen and the passive stylus and an active mode when using pen 200*c* as a mouse.

Figure 5:
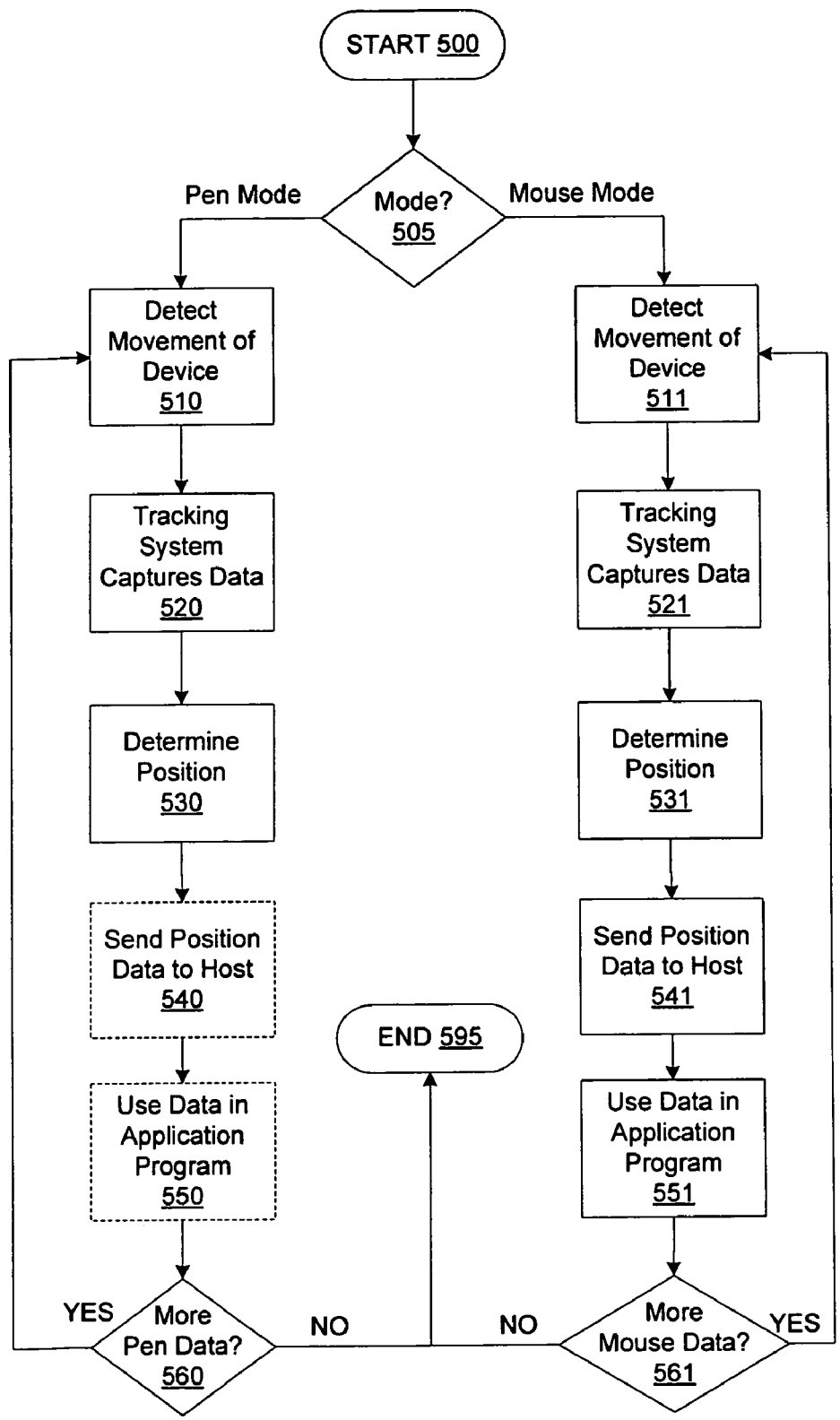
FIG. 5 illustrates exemplary non-limiting embodiments of various use scenarios for a dual mode electronic mouse pen in accordance with the invention.

FIG. 5 illustrates an exemplary flow diagram for operation of a pen, such as pen 200*b* of FIG. 4A or pen 200*c* of FIG. 4B, in two modes: a mode for determining detailed positional information about the pen and a mouse mode for determining mouse position. After start 500, a determination is made at 505 concerning the mode of operation for the pen. If the pen is in pen mode, then movement of the pen device is detected at 510. At 520, the tracking system captures data relating to the movement of the pen device. At 530, the position of the pen device is determined based on the data captured at 520. At 540, the data is optionally sent to a host device to which the positional information input of the pen device is directed (e.g., for control of the UI of the host device). At 550, optionally, the host device may use the positional information in an operating system, application and/or service in accordance with standard graphical user interface (GUI) techniques. If more data is to be captured from the pen device at 560, e.g., in an ongoing GUI experience, then the flow returns to the detection of movement at 510. When there is no more data to be captured by the pen device, the flow ends at 595.

If the pen is in mouse mode, then movement of the mouse sensors is detected at 511. At 521, the tracking system captures data relating to the movement of the pen device. At 531, the position of the device is determined based on the data captured at 521. At 541, the data is sent to a host device to which the mousing information input of the pen device is directed (e.g., for control of the UI of the host device), as well as any data from the mouse buttons or the like. At 551, the host device uses the mousing information in an operating system, application and/or service in accordance with standard graphical user interface (GUI) techniques. If more data is to be captured from the pen device at 561, e.g., in an ongoing GUI experience, then the flow returns to the detection of movement at 511. When there is no more data to be captured by the pen device, the flow ends at 595.

Thus, at any time during operation of the pen device in input mode, if the user switches the pen device to mouse mode from pen mode, or vice versa, in an exemplary fashion, the pen device switches operation. In pen mode, the user may capture pen stroke input according to pen stroke capture techniques described above. In mouse mode, the user may capture mouse input including button or positional information, as may be acquired during operation of a mouse device.

With respect to the types and kinds of integrated pen and mouse solutions that may be provided in accordance with the invention, current optical mice generally navigate using a correlation technique. Surface features are illuminated at a grazing angle with an LED and the system tracks the surface features as the user moves. Thus, in one embodiment, separate LEDs and separate sensors are provided in an electronic pen device for implementing illumination at a grazing angle in accordance with existing optical mouse techniques.

Since, however, current pen products do not illuminate at a grazing angle, with respect to an embodiment of the invention that integrates an optical mouse with a pen that does not utilize grazing illumination, there are some limitations to simply using current pens and their electronics for mouse operations too. For instance, use of the pen's mousing capabilities on all surfaces if the current pen sensor(s) were also used as mouse sensor(s) may be limited. For example, the mouse mode would navigate well on patterned surfaces, such as finely printed dots on a paper, but would not work well on non-patterned surfaces (glossy Formica, mirrors, etc.).

Another method of navigation which does not require grazing illumination is called "speckle navigation." Speckle navigation uses a laser to illuminate the surface and then tracking is performed on the resultant speckle pattern. In accordance with the invention, speckle navigation techniques and a laser may be conveniently employed to resolve relative XY positioning as the pen traverses surfaces with sufficient texture while in mouse mode. Thus, in accordance with a speckle navigation embodiment of the invention, a laser and associated electronics are included in the electronic pen for use in connection with the mouse mode of the invention.

When using either LED or laser illumination, to achieve mouse functionality, the image being tracked should be processed in a timely fashion to be an effective mouse input device. In this regard, relatively speaking, pen input image capture is performed much slower than the image capture rate for mouse devices, while the amount of data captured per frame in a pen is a much higher than the amount of data captured for a mouse. In exemplary current pen products, for instance, the pen product takes snapshots of the paper at 60-100 frames per second (FPS) while a navigation IC for a mouse receives frames at 5000 FPS (50 or more times as fast), and the array used for the pen has a significant number of pixels to readout (128×100 for pen operation) while a typical mouse requires only 20×20 pixels. A high frame rate for mice, coupled with a large number of pixels to process for pens, thus presents a barrier to providing a mouse pen integrated solution in accordance with the invention.

One way of overcoming the barrier in accordance with the invention is to utilize a "smart" array which has a dual mode of operation. In pen mode, all of the pixels from memory are transferred to the Processing IC. Thus, in FIG. 4A, memory M could be provided such that enough free space is provided to handle the increased memory requirements of pen mode, but only a subset of memory M need be used to store and transfer data to control 50 to satisfy mouse mode. In such a case, the Processing IC or control 50 performs navigation using the sub-array, and passes X-Y mouse information to the host machine, e.g., via interfaces 85.

In another embodiment of the invention, a "super-smart" memory array can be provided which performs navigation for mouse mode on the same die as the imager IC used for pen mode. In such an embodiment, digital circuits are added to the imager IC to process a sub-array of the imager when in mouse mode. These digital circuits then pass X-Y information to the Processing IC, which then transfer X-Y information to the host. In some respects, this embodiment of the invention is the preferred embodiment since all of the processing could be performed on the imager and only a subset of digital information need be sent to the processing IC, thus saving power as well.

In yet another embodiment of the invention, existing pen product imager ICs may be utilized, but because of the processing and memory limitations, the pen product only allows very slow mouse motion. Since the array has a large readout time to the processing IC, in this embodiment, the maximum navigation speed for mouse mode is scaled back, e.g., from 50 inches/sec to 1 inch/sec, which might be acceptable in some, but not all, instances in which a user may wish to use the pen in mouse mode. In this embodiment, the processing chip uses all/part of the imager IC's output to perform navigation. Similar circuits to the "smart" array embodiment described above can also be added to the processing IC.

In another embodiment, non-grazing LED illumination may be used, employing either relative or absolute positioning techniques. With normal illumination, where the light is directed at the surface generally orthogonally to the plane of the surface, images are taken of a surface feature pattern encoded in the surface. Such techniques can be relative positioning techniques, similar to the relative positioning techniques applied to grazing angle methods wherein images are compared to determine the movement of the mouse pen, or such techniques can be absolute positioning techniques, wherein a feature pattern encoded on a surface determines the absolute position of the mouse pen when an image is received by the mouse pen electronics.

In still another embodiment, neither grazing nor speckle illumination is used, but instead, feature patterns, such as dot patterns, are provided on a piece of special paper, or mouse pad, for use in connection with the mouse mode of the invention. In such an embodiment, the pen decodes the absolute position on the surface (similar to the way it can be done for pens) and calculates the relative distance moved since the last sample on the paper. This change in position is then reported to the host. This technique described implicates few changes to a pen that employs such a navigation technique, but would require the user to carry a patterned surface. In one embodiment, such a surface may be spiral wrapped around the pen, or otherwise detachably included with the pen, to eliminate the need to carry an extra surface. Additionally, such surface could be printed or embossed on a laptop, e.g., near the keyboard, to eliminate the need for the user to carry a special surface with the pen. As mentioned, an imager and/or processing IC may be used depending on the method chosen.

Figure 6:
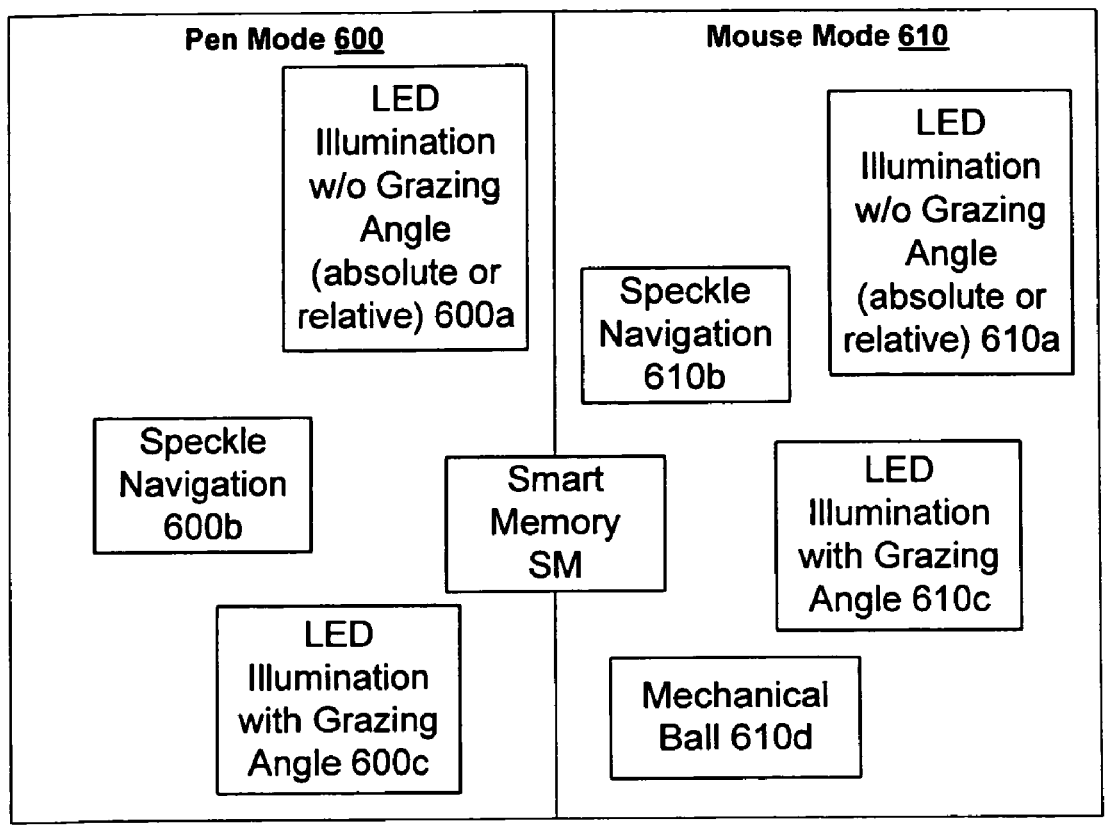
FIG. 6 illustrates exemplary permutations and combinations of pen tracking subsystems and mouse tracking subsystems that may be included inside an input device in accordance with the invention.

Conceptually, FIG. 6 illustrates some of the permutations and combinations of the invention described herein for achieving both pen mode operation and mouse mode operation. As illustrated, the pen, when in pen mode 600 of the various embodiments of the invention, may employ a non-grazing LED illumination tracking subsystem 600a, speckle navigation tracking subsystem 600b and/or a grazing LED illumination tracking subsystem 600c. The pen, when in mouse mode 610 of the various embodiments of the invention, may employ a non-grazing LED illumination tracking subsystem 610a, speckle navigation tracking subsystem 610b, a grazing LED illumination tracking subsystem 610c and/or a traditional ball mechanism 610d.

The invention thus provides systems and methods for selecting mouse/pen modes of operation for a dual-mode mouse pen, with various navigation techniques embedded within the pen processing IC and various navigation techniques embedded within the Imager IC. In some embodiments, a surface feature pattern can be used for pen input as well as mouse navigation.

Exemplary Networked and Distributed Environments

One of ordinary skill in the art can appreciate that the invention can be implemented in connection with input device of any computer or other client or server device, which can be deployed as part of a computer network, or in a distributed computing environment. In this regard, the present invention thus extends to any computer system or environment having any number of memory or storage units, and any number of applications and processes occurring across any number of storage units or volumes, which may be used in connection with processes for providing a dual mode input device in accordance with the present invention. The present invention may apply to an environment with server computers and client computers deployed in a network environment or distributed computing environment, having remote or local storage. The present invention may also be applied in the context of standalone computing devices, having programming language functionality, interpretation and execution capabilities for generating, receiving and transmitting information in connection with remote or local services and processes. Data can originate from anywhere in a computer network, and thus the techniques for providing alternate modes for an input device in accordance with the present invention can be applied with great efficacy in those environments.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for providing and using a dual mode input device in accordance with the invention.

Figure 7A:
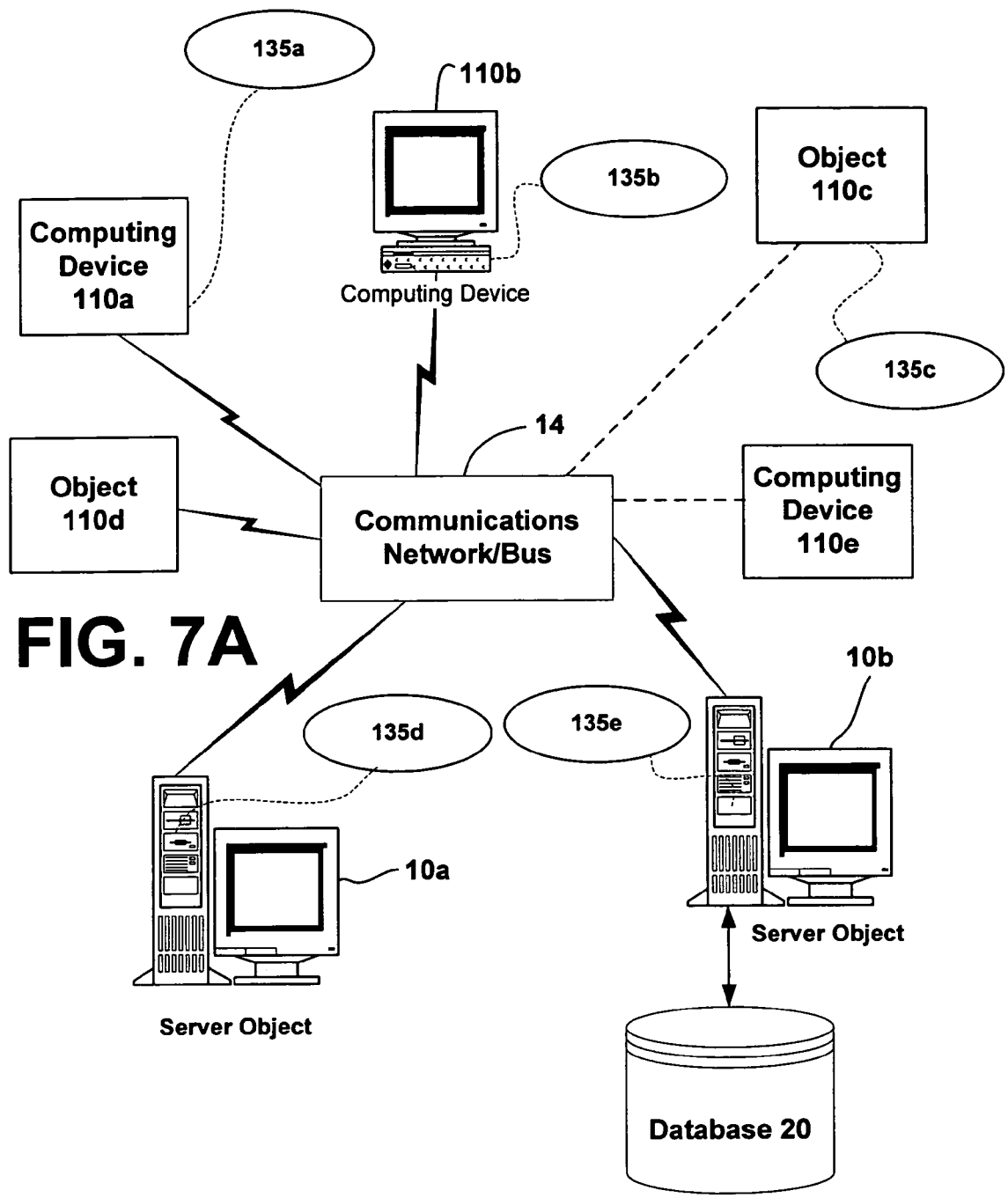
FIG. 7A is a block diagram representing a suitable computing system environment in which the present invention may be implemented.

FIG. 7A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 7A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, suitable for use with the systems and methods for providing a dual mode input device in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to a dual mode input device according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, moving forward, computing devices will require ways of sharing data, such as data accessed or utilized incident to program objects, which communicate with a dual mode input device in accordance with the present invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 7A, as an example, computers 110a, 110b, etc. can be thought of as clients and computers 10a, 10b, etc. can be thought of as servers where servers 10a, 10b, etc. maintain the data that is then replicated to client computers 110a, 110b, etc., although any computer can be considered a client, a server, or both, depending on the circumstances. Any of these computing devices may be processing data or requesting services or tasks that may implicate interfacing with the dual mode input device in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for communicating with a dual mode input device of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 7A illustrates an exemplary networked or distributed environment, with server(s) in communication with client computer (s) via a network/bus, in which the present invention may be employed. In more detail, a number-of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to use either mode of the dual mode input device of the invention.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

As mentioned, communications may be wired or wireless, or a combination, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed or saved according to the invention. Thus, the present invention can be utilized in a computer network environment having client computers 110a, 110b, etc. that can access and interact with a computer network/bus 14 and server computers 110a, 110b, etc. that may interact with client computers 110a, 110b, etc. and other like devices, and databases 20.

Exemplary Computing Device

Figure 7B:
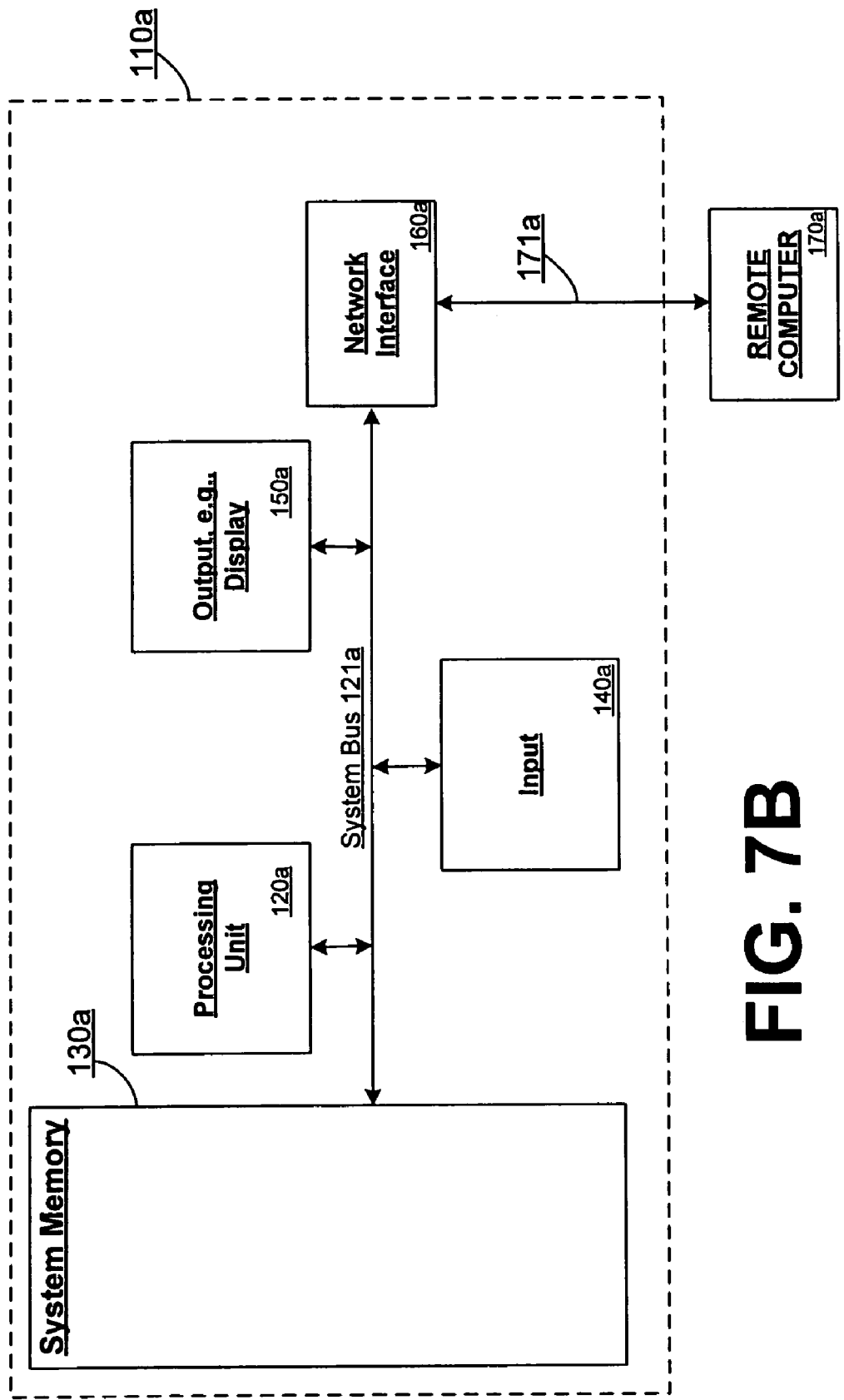
FIG. 7B is a block diagram representing an exemplary network environment in which the present invention may be implemented.

FIG. 7B and the following discussion are intended to provide a brief general description of a suitable computing environment in connection with which the invention may be utilized. It should be understood, however, that handheld, portable and other computing devices and computing objects of all kinds are contemplated for use in connection with the present invention, i.e., anywhere where that it is desirable to flexibly, or quickly access data or provide input in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the techniques for providing a dual mode input device in accordance with the invention.

Although not required, the invention can be implemented via an operating system, for use by a developer of services for a device or object, and/or included within application software that operates in connection with the methods for communicating with a dual mode input device of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes, as described above.

Exemplary Computing Device

As mentioned, the invention applies to any device wherein it may be desirable to shield a primary application from interference from secondary applications of the device. It should be understood, therefore, that handheld, portable and other computing devices and computing objects of all kinds are contemplated for use in connection with the present invention, i.e., anywhere that a device may receive content according to a variety of channels. Accordingly, the below general purpose, remote computer described below in FIG. 7B is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 7B thus illustrates an example of a suitable computing system environment 100a in which the invention may be implemented, although as made clear above, the computing system environment 100a is only one example of a suitable computing environment for a media device and is not intended to suggest any limitation as to the scope of use or functionality of the invention. Neither should the computing environment 100a be interpreted as having any dependency or requirement relating to any one or combination of components illustrated in the exemplary operating environment 100a.

With reference to FIG. 7B, an exemplary remote device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

A user may enter commands and information into the computer 110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 7B include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office.NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for communicating with a dual mode input device in accordance with the invention may be included in, supported in or accessed via all of the languages and services enabled by managed code, such as .NET code, and in other distributed computing frameworks as well.

Exemplary Interface Implementations

For any exchange of data among multiple computers, such as sharing, accessing, rendering, downloading or uploading data to or from a dual mode input device of the invention and a computing device according to the techniques of the invention and shared between two computers, there are interfaces for handling the various operations on the dual mode input device and/or the computing device that can be implemented in hardware and/or software and which operate to receive, send and/or process the data in some fashion, according to the relevant applications and services being requested or provided. To the extent that one or more interface objects may be provided to achieve or implement any portion of the systems and methods for providing, using or communicating with a dual mode input device in accordance with the invention, the invention is intended to encompass all such embodiments, and thus a general description of the kinds of interfaces that might be provided or utilized when implementing or carrying out the invention follows.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 8A:
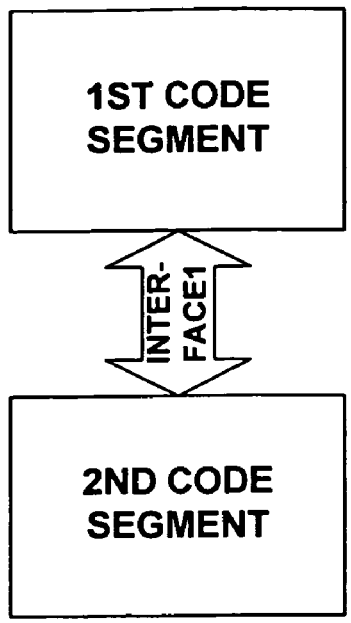
FIGS. 8A, 8B, 9A, 9B, 10A, 10B, 11A, 11B, 12A, 12B, 13A and 13B illustrate exemplary ways in which similar interface code can be provided to achieve similar or equivalent objective(s) of any interface(s) in accordance with the invention.
Figure 8B:
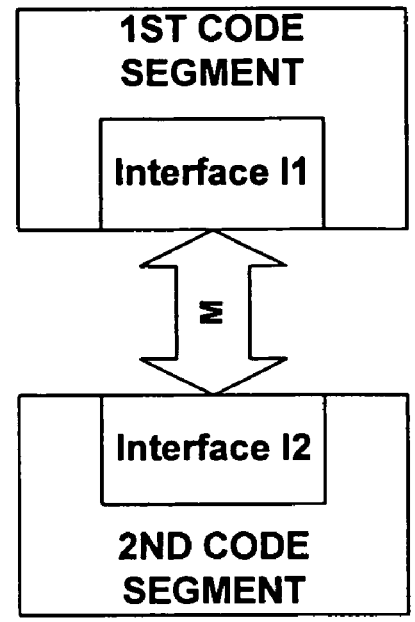

Notionally, a programming interface may be viewed generically, as shown in FIG. 8A or FIG. 8B. FIG. 8A illustrates an interface Interface1 as a conduit through which first and second code segments communicate. FIG. 8B illustrates an interface as comprising interface objects I1 and I2 (which may or may not be part of the first and second code segments), which enable first and second code segments of a system to communicate via medium M. In the view of FIG. 8B, one may consider interface objects I1 and I2 as separate interfaces of the same-system and one may also consider that objects I1 and I2 plus medium M comprise the interface. Although FIGS. 8A and 8B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 8A and 8B, but they nonetheless perform a similar function to accomplish the same overall result. We will now briefly describe some illustrative alternative implementations of a programming interface.

A. Factoring

Figure 9A:
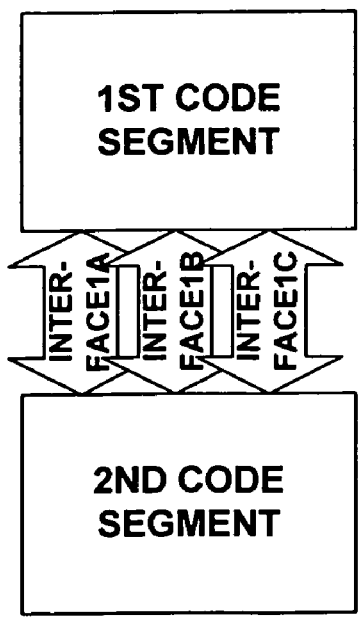
Figure 9B:
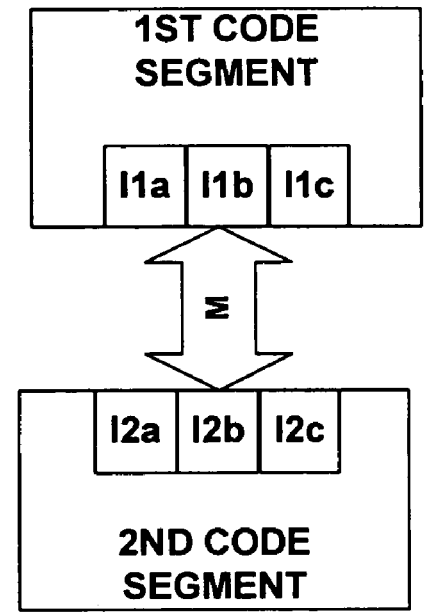

A communication from one code segment to another may be accomplished indirectly by breaking the communication into multiple discrete communications. This is depicted schematically in FIGS. 9A and 9B. As shown, some interfaces can be described in terms of divisible sets of functionality. Thus, the interface functionality of FIGS. 8A and 8B may be factored to achieve the same result, just as one may mathematically provide 24, or 2 times 2 time 3 times 2. Accordingly, as illustrated in FIG. 9A, the function provided by interface Interface1 may be subdivided to convert the communications of the interface into multiple interfaces Interface 1A, Interface 1B, Interface 1C, etc. while achieving the same result. As illustrated in FIG. 9B, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1$^{st}$ code segment need not match the number of interfaces included with the 2$^{nd}$ code segment. In either of the cases of FIGS. 9A and 9B, the functional spirit of interfaces Interface1 and I1 remain the same as with FIGS. 8A and 8B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 10A:
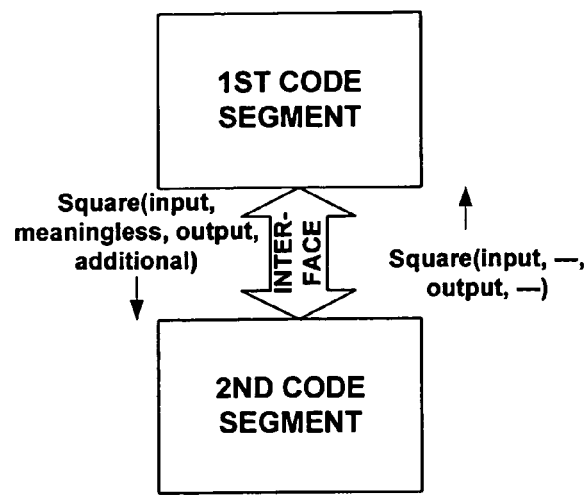
Figure 10B:
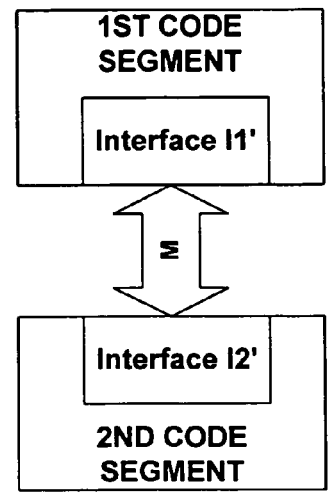

In some cases, it may be possible to ignore, add or redefine certain aspects (e.g., parameters) of a programming interface while still accomplishing the intended result. This is illustrated in FIGS. 10A and 10B. For example, assume interface Interface1 of FIG. 8A includes a function call Square(input, precision, output), a call that includes three parameters, input, precision and output, and which is issued from the $1^{st}$ Code Segment to the $2^{nd}$ Code Segment., If the middle parameter precision is of no concern in a given scenario, as shown in FIG. 10A, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 10B, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 11A:
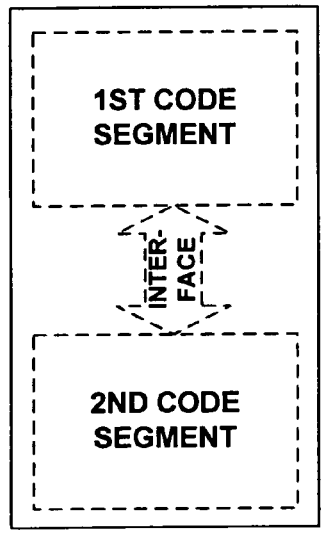
Figure 11B:
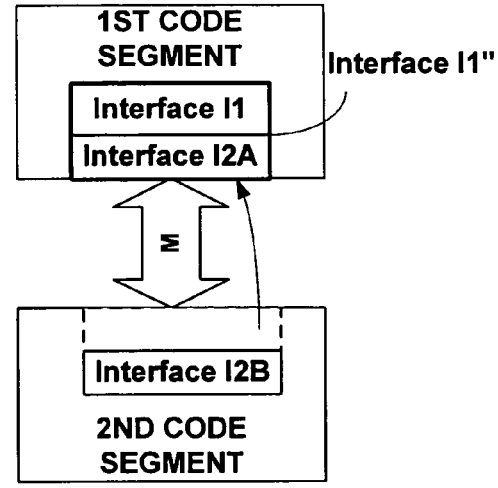

It may also be feasible to merge some or all of the functionality of two separate code modules such that the "interface" between them changes form. For example, the functionality of FIGS. 8A and 8B may be converted to the functionality of FIGS. 11A and 11B, respectively. In FIG. 11A, the previous $1^{st}$ and $2^{nd}$ Code Segments of FIG. 8A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 11B, part (or all) of interface I2 from FIG. 8B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 8B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 12A:
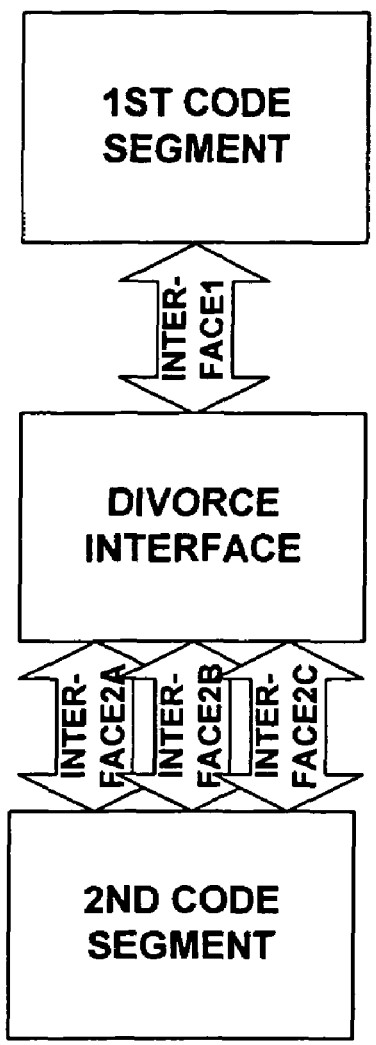
Figure 12B:
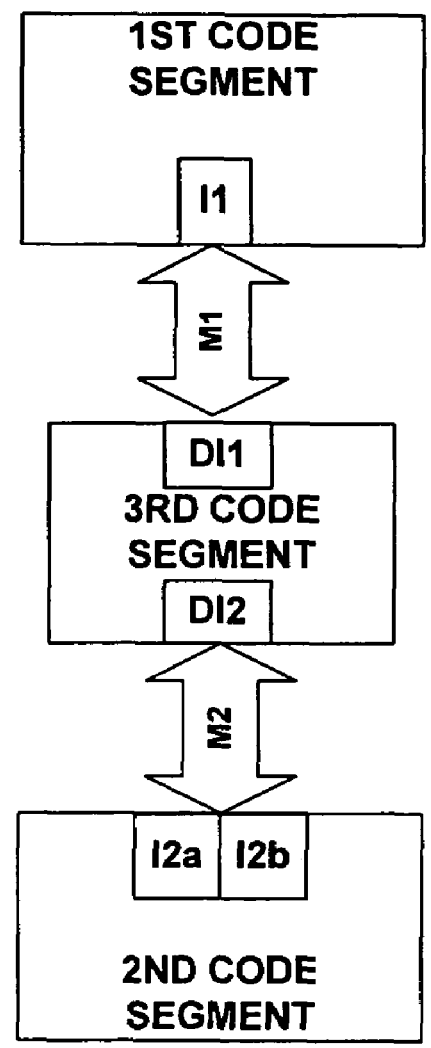

A communication from one code segment to another may be accomplished indirectly by breaking the communication into multiple discrete communications. This is depicted schematically in FIGS. 12A and 12B. As shown in FIG. 12A, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 12B, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 8B to a new operating system, while providing the same or similar functional result.

E. Rewriting

Figure 13A:
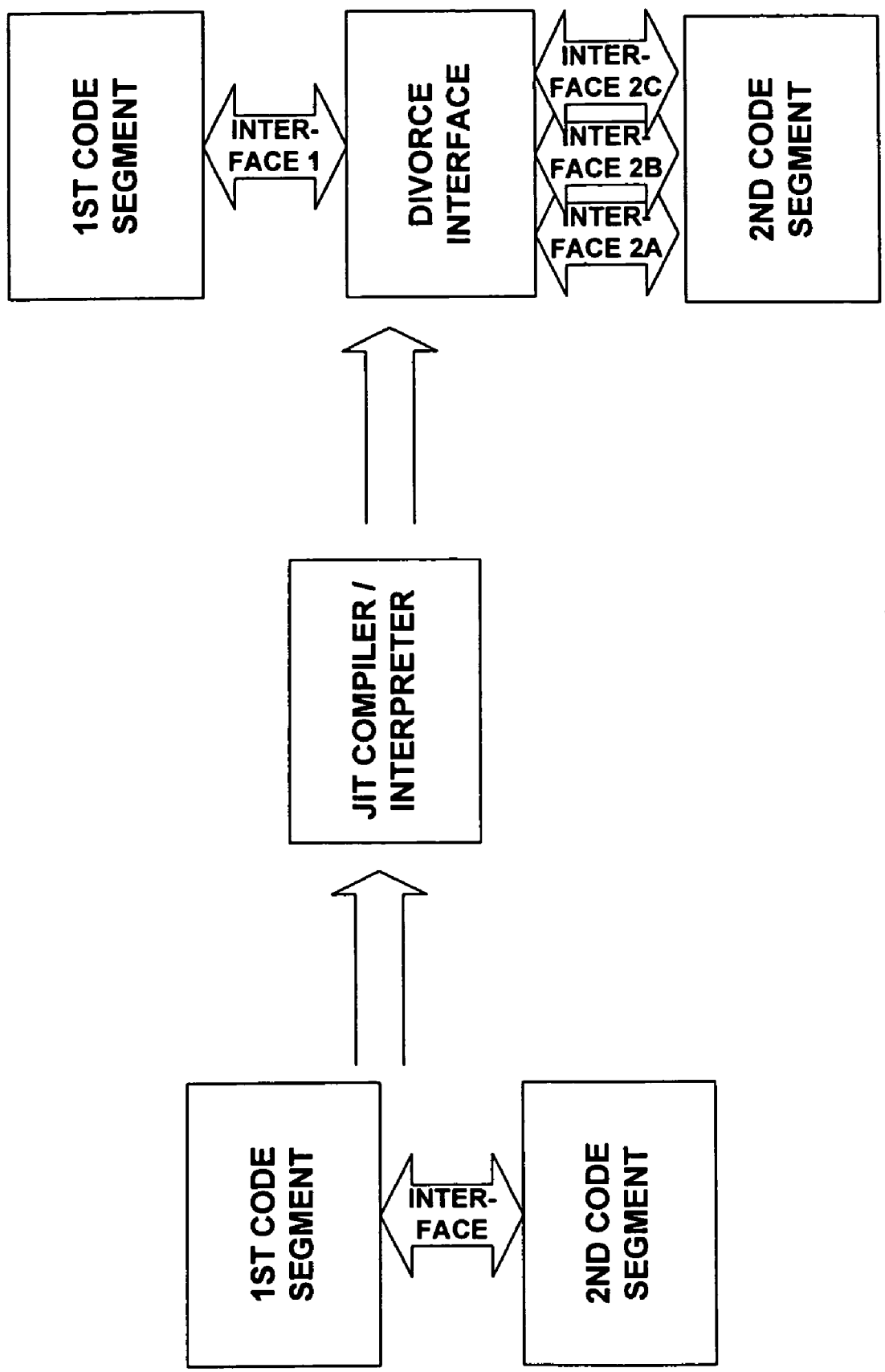
Figure 13B:
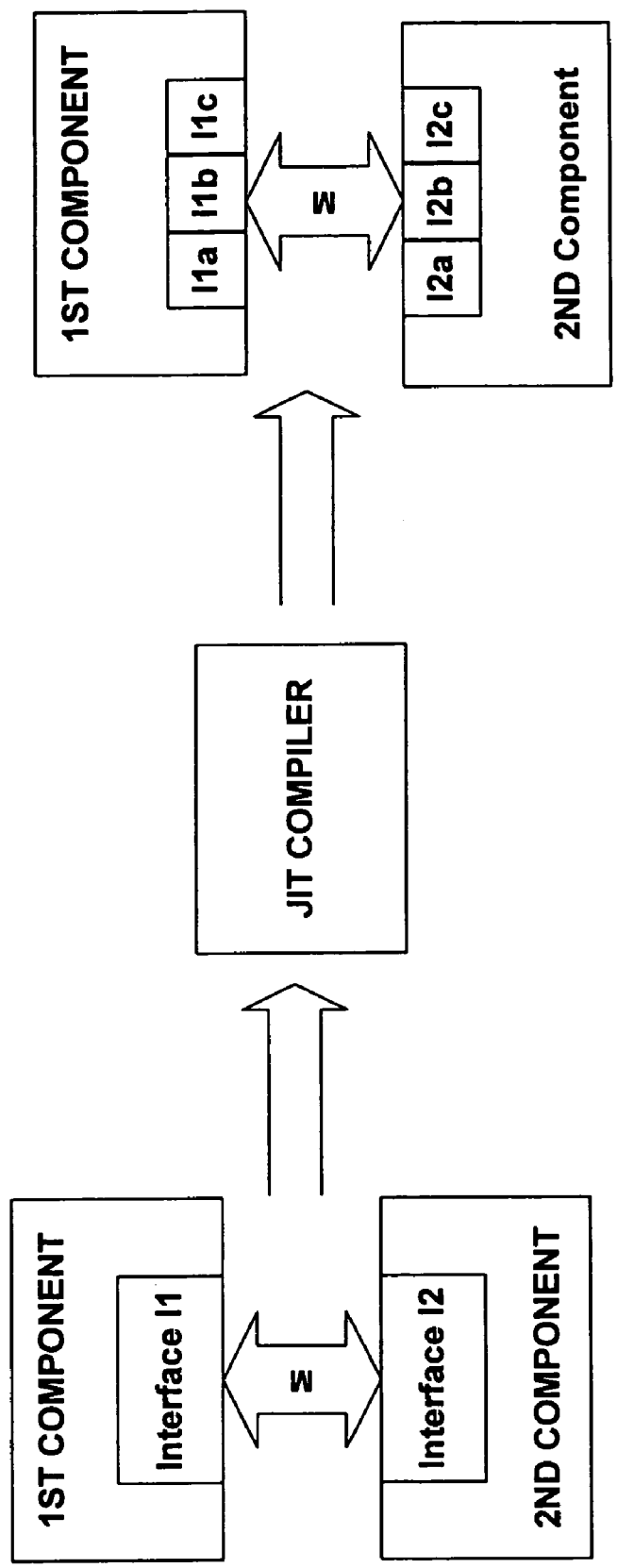

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 13A and 13B. As can be seen in FIG. 13A, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 13B, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 8A and 8B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

There are multiple ways of implementing the present invention, e.g., an appropriate API, tool kit, driver code, operating system, control, standalone or downloadable software object, etc. which enables applications and services to use the systems and methods for downloading algorithmic elements to a coprocessor of the invention. The invention contemplates the use of the invention from the standpoint of an API (or other software object), as well as from a software or hardware object that receives a downloaded program in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to share data with a mouse pen. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the functionality of the mouse pen of the present invention, e.g., through the use of a data processing API, controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also-be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments may refer to utilizing the present invention in the context of particular programming language constructs, the invention is not so limited, but rather may be implemented in any language to provide a dual mode mouse pen in accordance with the invention. Additionally, one of ordinary skill in the art can appreciate that there are some currently existing forms of mouse that include of a metal or plastic housing or casing and a ball that sticks out of the bottom of the casing, which is generally rolled on a flat surface. As the ball is moved over the surface in any direction, a sensor sends impulses to the computer that causes a mouse-responsive program to reposition the visible indicator on the display screen. Accordingly, a pen may also me implemented in accordance with the invention with a ball, e.g., where one end of the pen includes the ball for mouse navigation, and the other end of the pen includes the stylus point for drawing. Still further, the present invention may be implemented in or across a plurality of processing chips or devices, and any storage may similarly be effected across a plurality of devices. Therefore, the present invention should not be limited to any single embodiment, but rather should be construed in breadth and scope in accordance with the appended claims.

What is claimed is:

1. A method for utilizing a pen, comprising:
receiving, by an imager integrated circuit of a pen in a first mode of operation, light reflected from a surface at a first frame rate, wherein the reflected light identifies a pattern embedded in the surface, the embedded pattern indicating at least one position on the surface;
storing a first set of pixels representing the reflected light in a first memory;
determining, by a processing integrated circuit coupled to the imager, an absolute position of the pen from the reflected light;
receiving a request to enter a second mode;
receiving, by the imager integrated circuit of the pen in the second mode, laser light reflected from the surface at a second frame rate, wherein the reflected laser light identifies a speckle pattern;

storing a second set of pixels representing the speckle pattern in a second memory; and determining, by a laser processing integrated circuit from the set of pixels representing the speckle pattern, a relative position of the pen, wherein the second memory, the laser processing integrated circuit and the imager integrated circuit are fabricated on the same die, further wherein the first frame rate is less than the second frame rate and the first set of pixels is larger than the second set of pixels.

2. A method according to claim 1, further comprising:
transmitting, in the first mode, the determined absolute position to a host device.

3. A method according to claim 2, further comprising:
transmitting, by the pen in the first mode of operation, a light using a grazing LED illumination tracking subsystem.

4. A method according to claim 1, further comprising:
transmitting, by the pen in the second mode of operation, a laser light using a speckle navigation tracking subsystem.

5. A method according to claim 1, further comprising:
at least one of switching the pen from the first mode to the second mode and switching the pen from the second mode to the first mode.

6. A method according to claim 1, further comprising:
transmitting, in the second mode of operation, the determined relative position of the pen to a host device.

7. A method according to claim 1, further comprising:
receiving from the host device a command from the host device that switches the pen at least one of into and out of the second mode.

8. A method according to claim 1, further comprising:
sharing a memory for said absolute position of the pen and said relative position of the pen inside the pen, wherein a subset of said memory is used in the second mode compared to the memory consumption of the first mode.

9. A dual mode electronic stylus device, comprising:
first electronics corresponding to a first mode of operation for the electronic stylus device, the first electronics including a light emitting diode that is operable to illuminate a surface encoded with positional information, the first electronics additionally including an imager integrated circuit configured to receive a reflection of the light from a surface at a first frame rate;
a first memory location coupled to the imager integrated circuit configured to receive a first set of pixels representing the reflected light;
a processor coupled to the first memory configured to determine an absolute position of the stylus from the pixels that represent positional information in the reflected light;
second electronics corresponding to a second mode of operation for the electronic stylus device, the second electronics including a laser that is operable to generate a speckle pattern on at least the surface;
the imager integrated circuit configured to receive a reflection of the speckle pattern at a second frame rate, store pixels representing the speckle pattern in a second memory, and process the pixels representing the speckle pattern using a speckle pattern processor to determine a relative position of the stylus, wherein the imager integrated circuit, the second memory, and the speckle pattern processor are fabricated on the same die, further wherein the first frame rate is less than the second frame rate and the first set of pixels is larger than the second set of pixels; and a display operable to render a user interface that includes a button operable to switch the stylus between the first and second modes of operation.

10. An electronic stylus device according to claim 9, wherein the light emitting diode is a grazing LED illumination tracking subsystem.

11. An electronic stylus device according to claim 9 wherein the light emitting diode is a speckle navigation tracking.

12. An electronic stylus device according to claim 9, wherein the user interface is operable to render at least one mouse control including at least one button in the second mode of operation.

13. An electronic stylus device according to claim 9, further comprising:
a memory, wherein the memory is used to record the absolute position of the pen in the first mode and to record the relative position of the pen in the second mode.

14. An electronic stylus device according to claim 9, further comprising:
a transmitter, wherein the transmitter is configured to transmit the actual position of the pen in the first mode, and the transmitter is configured to transmit the relative position of the pen in the second mode to a host device.

15. An electronic stylus device, comprising:
a user interface operable to render at least one button;
first electronics corresponding to a pen mode of operating for the electronic stylus device, the first electronics including a light emitting diode that is operable to illuminate a surface encoded with positional information, the first electronics additionally including an imager integrated circuit configured to receive a reflection of the light from a surface at a first frame rate;
a first memory location coupled to the imager integrated circuit configured to receive a first set of pixels representing the reflected light;
a processor coupled to the first memory configured to process the pixels representing the reflected light;
second electronics corresponding to a mouse mode of operation for the electronic stylus device, whereby when the electronic stylus device operates in the mouse mode, the electronic stylus device is configured to generate a speckle pattern on a surface, and to detect selection of said at least one button and to transmit a command associated with said at least one button to a host device; and
the imager integrated circuit configured to receive a reflection of the speckle pattern at a second frame rate, store pixels representing the speckle pattern in a second memory, and process the pixels representing the speckle pattern using a speckle pattern processor to determine a relative position of the stylus, wherein the imager integrated circuit, the second memory, and the speckle pattern processor are fabricated on the same die, further wherein the first frame rate is less than the second frame rate and the first set of pixels is larger than the second set of pixels.

16. An electronic stylus device according to claim 15, wherein the electronic stylus device further includes electronics corresponding to a pen mode of operation, whereby when the electronic stylus device operates in the pen mode, the electronic device is configured to receive light reflected off a surface that includes an embedded pattern that indicates at least one position of the surface.

* * * * *

UNITED STATES PATENT AND TRADEMARK OFFICE
CERTIFICATE OF CORRECTION

| | | |
|---|---|---|
| PATENT NO. | : 7,483,018 B2 | Page 1 of 1 |
| APPLICATION NO. | : 11/121806 | |
| DATED | : January 27, 2009 | |
| INVENTOR(S) | : Thomas C. Oliver | |

It is certified that error appears in the above-identified patent and that said Letters Patent is hereby corrected as shown below:

In column 26, line 7, in Claim 11, delete "9" and insert -- 9, --, therefor.

Signed and Sealed this
Third Day of May, 2011

David J. Kappos
*Director of the United States Patent and Trademark Office*